United States Patent
Ra et al.

(10) Patent No.: US 7,438,622 B2
(45) Date of Patent: Oct. 21, 2008

(54) FABRICATION METHOD OF CARBON-FIBER WEB STRUCTURE TYPE FIELD EMITTER ELECTRODE

(75) Inventors: Seung Hyun Ra, Sungnam (KR); Kay Hyeok An, Suwon (KR); Young Hee Lee, Suwon (KR); Jong Myeon Lee, Seoul (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 425 days.

(21) Appl. No.: 11/064,960

(22) Filed: Feb. 25, 2005

(65) Prior Publication Data

US 2006/0066201 A1 Mar. 30, 2006

(30) Foreign Application Priority Data

Sep. 24, 2004 (KR) .................... 10-2004-0076836

(51) Int. Cl.
*H01J 9/04* (2006.01)
*H01J 9/12* (2006.01)
(52) U.S. Cl. ................. 445/51; 445/49; 445/50
(58) Field of Classification Search .......... 445/35, 445/49–51; 313/310, 495–497
See application file for complete search history.

(56) References Cited

U.S. PATENT DOCUMENTS

2004/0108804 A1* 6/2004 Hsu .................... 313/495
2005/0025974 A1* 2/2005 Lennhoff ............... 428/408

FOREIGN PATENT DOCUMENTS

KR  10-2004-0083573   10/2004
KR  10-2005-0062407   5/2006

OTHER PUBLICATIONS

Korean Intellectual Property Office, Office Action, mailed Mar. 30, 2006.

* cited by examiner

*Primary Examiner*—Joseph L. Williams
*Assistant Examiner*—Bumsuk Won
(74) *Attorney, Agent, or Firm*—Lowe Hauptman Ham & Berner

(57) ABSTRACT

The present invention provides a field emitter electrode and a method for fabricating the same. The method comprises the steps of mixing a carbonizable polymer, carbon nanotubes and a solvent to prepare a carbon nanotube-containing polymer solution, electrospinning (or electrostatic spinning) the polymer solution to form a nanofiber web layer on a substrate, stabilizing the nanofiber web layer such that the polymer present in the nanofiber web layer is crosslinked, and carbonizing the nanofiber web layer such that the crosslinked polymer is converted to a carbon fiber.

5 Claims, 6 Drawing Sheets

FABRICATION METHOD OF CARBON-FIBER WEB STRUCTURE TYPE FIELD EMITTER ELECTRODE

RELATED APPLICATIONS

The present application is based on, and claims priority from, Korean Application NO. 2004-76836, filed on Sep. 24, 2004, the disclosure of which is incorporated by reference herein in its entirety.

BACKGROUND OF THE INVENTION

1. Field of the Invention

The present invention relates to a carbon nanotube field emitter electrode. More particularly, the present invention relates to a field emitter electrode having a novel structure which not only improves the adhesive strength of carbon nanotubes but also exhibits improved contact resistance, and a method for fabricating the field emitter electrode.

2. Description of the Related Art

Generally, field emission devices are light sources for emitting electrons in a vacuum environment, and use the principle that electrons emitted from fine particles are accelerated by a strong electric field to collide with fluorescent substances, thus emitting light. Such field emission devices provide superior luminescence efficiency and are compact and lightweight, compared to light sources for general illuminators, such as incandescent lamps. In addition, since field emission devices do not use heavy metals, unlike fluorescent lamps, they have the advantage of being environmentally friendly. For these reasons, field emission devices have drawn attention as next-generation light sources for various illuminators and display devices.

The performance of field emission devices is mainly determined by emitter electrodes capable of emitting a field. In recent years, a carbon nanotube (CNT) has been widely used as an electron-emitting material for emitter electrodes having excellent electron emission properties.

However, carbon nanotubes have a problem in terms of non-uniform growth on a large-area substrate. In an attempt to solve this problem, carbon nanotubes grown by a separate process are purified before adhesion to the substrate. Representative methods for fabricating a carbon nanotube emitter electrode include common printing and electrophoresis.

The fabrication of a carbon nanotube emitter electrode by printing is carried out in accordance with the following procedure. First, an electrode material is coated on a smooth substrate to form an electrode layer. Then, a paste of carbon nanotubes and a silver powder is printed on the electrode layer. The resulting structure is subjected to an annealing process to remove the resin and the solvent present in the paste. The annealed structure is subjected to taping to partially expose the carbon nanotubes to the surface.

However, the conventional method has the problems that the procedure is complicated and uniform dispersion of the carbon nanotubes is difficult, thus deteriorating the characteristics of the final field emitter electrode. In addition, sufficient physical and mechanical adherence of the paste to the underlying electrode material cannot be achieved by known paste printing processes.

On the other hand, the fabrication of a carbon nanotube emitter electrode by electrophoresis is carried out by the following procedure. Referring to FIG. 1, first, previously purified carbon nanotubes and a dispersant (e.g., a cationic dispersant) are mixed in an electrolytic solution. Then, a predetermined voltage is applied to both electrodes immersed in the electrolytic solution to adhere the carbon nanotubes to a substrate formed on the cathode.

The use of electrophoresis enables the carbon nanotubes to be relatively uniformly dispersed in the electrolytic solution, and simplifies the overall procedure. However, the conventional method has the problem that the carbon nanotubes are susceptible to mechanical impact because of their poor adhesive strength to the substrate.

In addition, since a large quantity of organic components remain on the electrically conductive polymer constituting the emitter electrode, they are likely to be oxidized once the emitter electrode is operated, which largely deteriorates the field emission properties. In extreme cases, undesired gases may be generated in an electron emission space where a vacuum is required, seriously degrading the performance of the field emission device.

SUMMARY OF THE INVENTION

Therefore, the present invention has been made in view of the above problems, and it is an object of the present invention to provide a novel field emitter electrode having a carbon-fiber web structure in which carbon nanofibers contain carbon nanotubes.

It is another object of the present invention to provide a method for fabricating the field emitter electrode by electrospinning (or electrostatic spinning), the field emitter electrode having a carbon-fiber web structure in which carbon nanofibers contain carbon nanotubes.

In accordance with one aspect of the present invention, the above objects can be accomplished by a field emitter electrode having a carbon-fiber web structure comprising a carbon-fiber web layer composed of a plurality of carbon nanofibers, and a plurality of carbon nanotubes adhered to or contained in the plurality of nanofibers wherein at least a portion of the carbon nanotube is exposed to the outside of the nanofiber.

The carbon-fiber web layer can be formed of at least one material selected from the group consisting of polyacrylonitriles, celluloses, phenol resins, and polyimides.

Preferably, the carbon nanofibers have a larger diameter than the carbon nanotubes.

In accordance with another aspect of the present invention, there is provided a method for fabricating the field emitter electrode having a carbon-fiber web structure by electrospinning, the method comprising the steps of: mixing a carbonizable polymer, carbon nanotubes and a solvent to prepare a carbon nanotube-containing polymer solution; electrospinning the polymer solution to form a nanofiber web layer on a substrate; stabilizing the nanofiber web layer such that the polymer present in the nanofiber web layer is crosslinked; and carbonizing the nanofiber web layer such that the crosslinked polymer is converted to a carbon fiber.

The carbonizable polymer may be at least one selected from the group consisting of polyacrylonitriles, celluloses, phenol resins, and polyimides.

The nanofiber web layer can be composed of nanofibers having a diameter larger than the carbon nanotubes. The substrate may be an electrically conductive substrate, such as an aluminum or copper sheet.

The stabilization of the nanofiber web layer can be carried out by oxidizing the polymer present in the nanofiber web layer in an oxidizing atmosphere at 150~350° C. The carbonization of the nanofiber web layer can be carried out by carbonizing the crosslinked polymer in an inert atmosphere at 600~1,300° C.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention will now be described in more detail with reference to the accompanying drawings.

Figure 1:
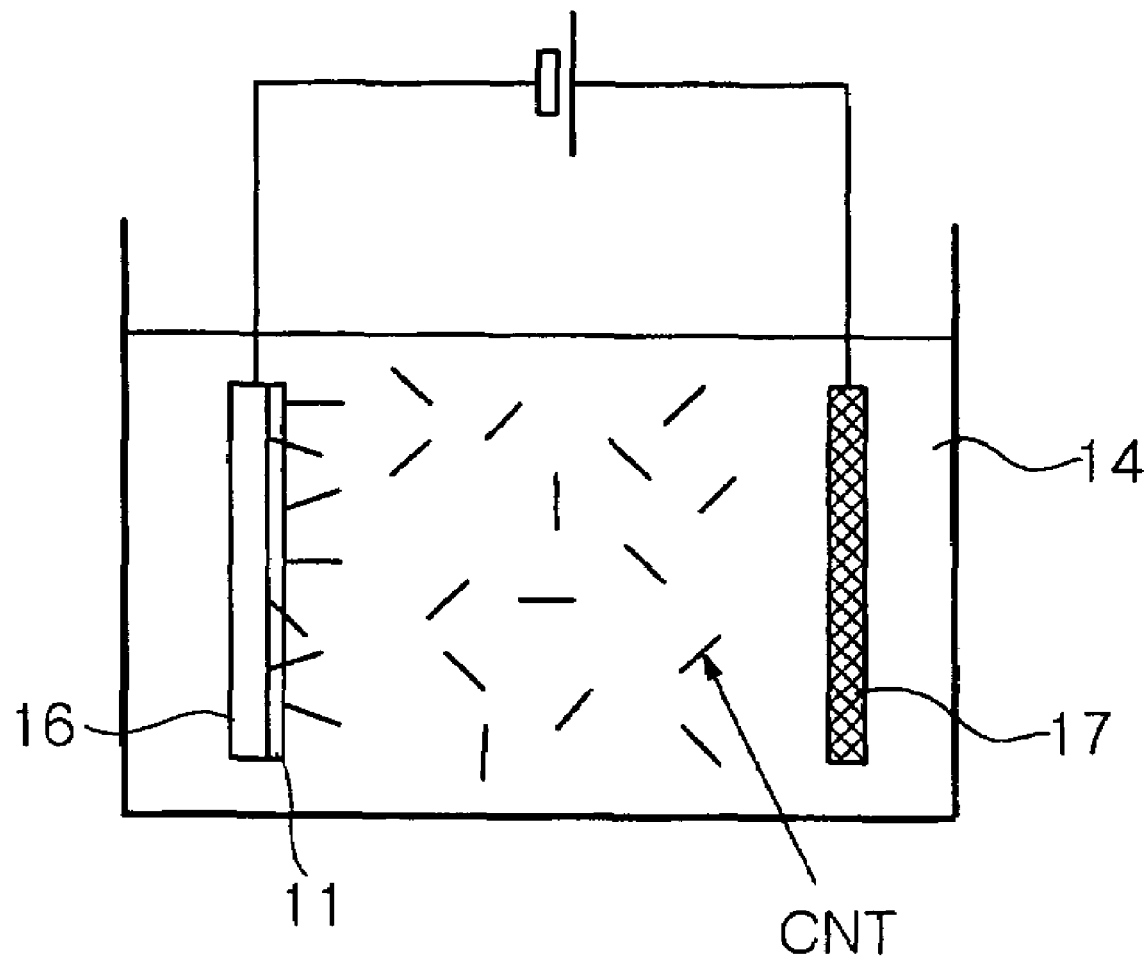
FIG. 1 is a schematic views of an apparatus used in a conventional method for fabricating a field emitter electrode by electrophoresis.
Figure 2:
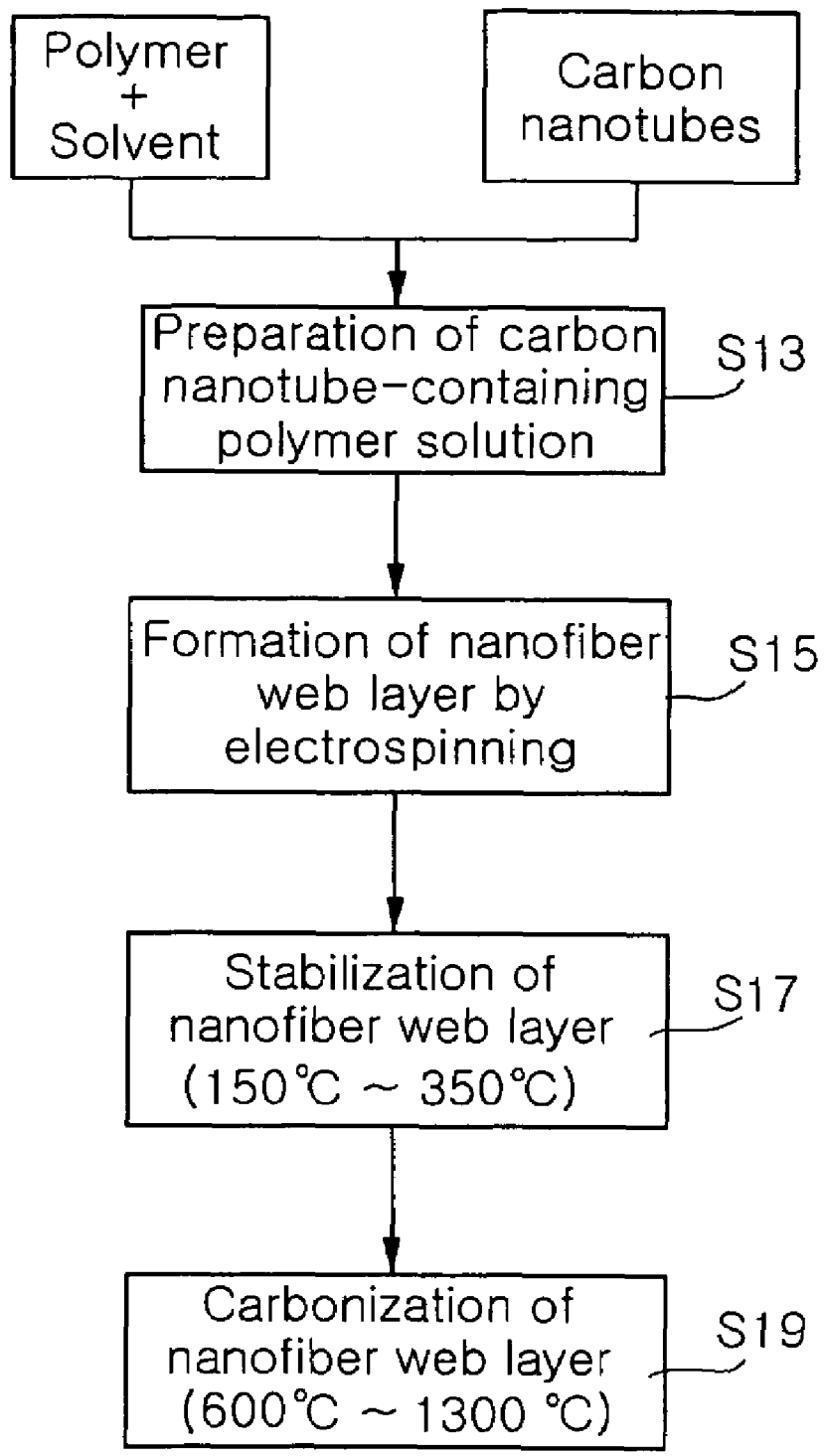
FIG. 2 is a flow chart illustrating a method for fabricating a field emitter electrode according to the present invention.

FIG. 2 is a flow chart illustrating a method for fabricating a field emitter electrode according to the present invention.

Referring to FIG. 2, the method for fabricating a field emitter electrode according to the present invention is initiated by mixing a carbonizable polymer, carbon nanotubes and a solvent to prepare a carbon nanotube-containing polymer solution (S13).

Any polymer can be used in the present invention so long as it is carbonizable. The polymer may be at least one material selected from the group consisting of polyacrylonitriles, celluloses, phenol resins, and polyimides. The kind of the solvent used in the present invention can be properly selected according to the type of the selected polymer. For example, the solvent may be dimethylformamide (DMF), toluene, benzene, acetone, or alcohol.

The carbon nanotubes used in the present invention can be obtained by pulverizing multi-wall or single-wall carbon nanotubes by chemical vapor deposition (CVD) or arc discharge, and purifying the pulverized multi-wall or single-wall carbon nanotubes by known processes, such as field-flux-flow fractionation. The carbon nanotubes thus obtained preferably have a length of 1 µm to 2 µm, and a diameter of a few nanometers to tens of nanometers.

Thereafter, the polymer solution is electrospun to form a nanofiber web layer on a substrate (S15).

Generally, electrospinning is a process that has been widely used in various industrial fields, including fibers, fuel cells, and cell electrodes, and refers to a process wherein nanofibers having a diameter of a few nanometers to hundreds of nanometers are spun from a polymeric precursor material by applying an electrostatic voltage to the precursor to form a random web structure. Similarly, when an electrostatic voltage is applied between the carbon nanotube-containing polymer solution and the substrate in step (S15), nanofibers containing the carbon nanotubes are spun on the substrate and thus a desired nanofiber web layer can be formed on the substrate.

Figure 3:
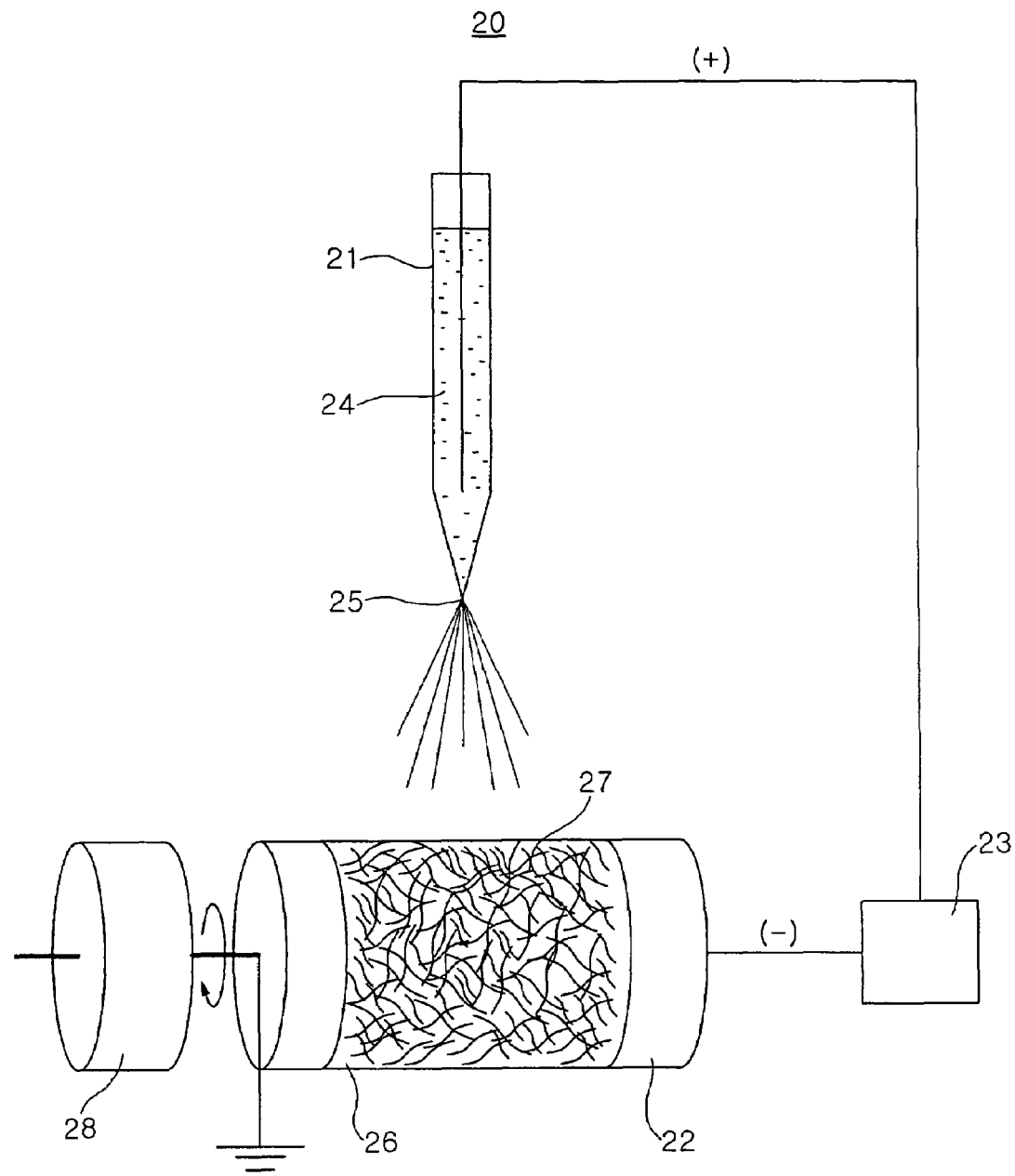
FIG. 3 is a schematic view of an electrospinning apparatus usable in a method for fabricating a field emitter electrode according to the present invention.
Figure 4A:
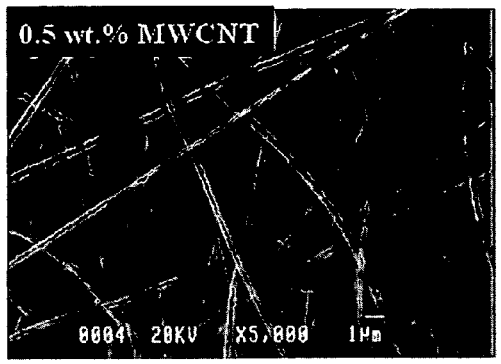
FIGS. 4a to 4e are scanning electron micrographs (SEM) (5,000×) of electrospun nanofiber web structures formed in Example 1 of the present invention.
Figure 4B:
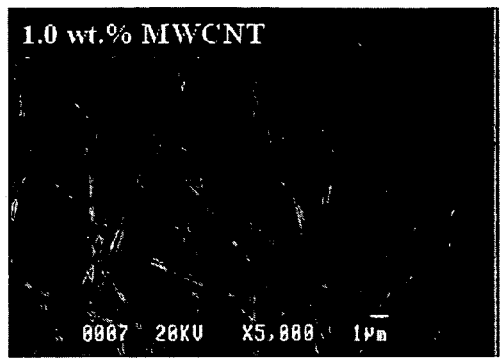
Figure 4C:
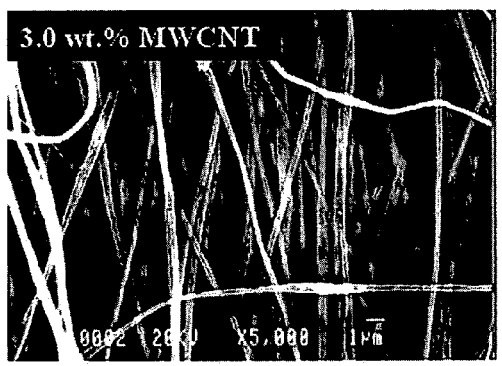
Figure 4D:
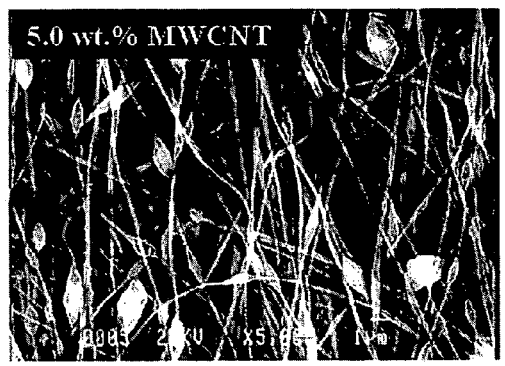
Figure 4E:
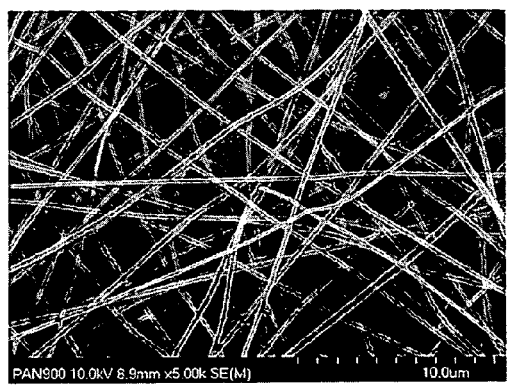

The substrate usable in step (S15) may be a non-conductive film having a thickness small enough to allow the applied electrostatic voltage for electrospinning, but is preferably an electrically conductive substrate, such as an aluminum or copper sheet, usable as a substrate for an emitter electrode. Details of the electrospinning process employed in the present invention are shown in FIG. 3.

Next, the nanofiber web layer formed on the substrate by electrospinning is stabilized (S17). This stabilization is achieved by annealing the nanofiber web layer in an oxidizing gas atmosphere at a predetermined temperature, and thus refers to "an oxidation process". The annealing conditions vary depending on the kind of the polymer used, but the annealing is preferably carried out at a temperature ranging from about 150° C. to about 350° C. for 2~5 hours. At this step, the polymer present in the nanofiber web layer is crosslinked by the action of oxygen, making the nanofiber web layer stable.

Finally, the stabilized nanofiber web layer is carbonized (S19). In step (S19), this carbonization is achieved by annealing the stabilized nanofiber web layer in an inert atmosphere at a predetermined temperature, and refers to a step wherein organic components remaining after formation of a hexagonal graphite structure are removed from the crosslinked polymer, and the crosslinked polymer is converted to a carbon fiber. The carbonization is preferably carried out in an inert gas atmosphere, e.g., nitrogen, at 600~1,300° C. for about 0.5 hours to about 1 hour. Since organic components remaining after formation of a hexagonal graphite structure are removed from the crosslinked polymer in step (S19), the problem encountered with remaining organic components in the prior art using a conductive polymer can be solved. In addition, additional annealing may be carried out to activate the carbon nanofibers.

As demonstrated above, according to the method of the present invention, an emitter electrode having a carbon-fiber web structure can be fabricated by electrospinning. Although the electrospinning has been mainly employed to prepare a carbon fiber for use in fuel cells and cell electrodes, an emitter electrode having a carbon-fiber web structure can be fabricated by electrospinning a carbon nanotube-containing polymer solution.

In the emitter electrode having a carbon-fiber web structure according to the present invention, since the carbon nanotubes are fixed in the carbon nanofibers or the carbon-fiber web structure, they have strong adhesive strength. In addition, since the emitter electrode of the present invention has a basic structure consisting of the highly conductive carbon nanofibers with a large specific surface area, the contact resistance can be greatly increased.

FIG. 3 is a schematic view of an electrospinning apparatus usable in the method of the present invention. It will be understood that the apparatus is provided to carry out the step (S15) shown in FIG. 2.

As shown in FIG. 3, the electrospinning apparatus comprises a pipette 21, a rotating drum 22, and a high-voltage generator 23 electrically connected to both the pipette 21 and the rotating drum 22. The carbon nanotube-containing polymer solution 24 (i.e. a mixture of the carbon nanotubes, the carbonizable polymer and the solvent) is stored in the pipette 21. The polymer solution 24 is maintained at a constant level in the pipette 21 by an automatic feeding machine (not shown). A substrate 26 on which an emitter electrode is to be formed is mounted on the rotating drum 22. The rotating drum 22 is connected to an electric motor 28 such that the rotating drum 22 is rotated at a constant speed.

When an electric voltage generated by the high-voltage generator 23 is applied between the polymer solution 24 present in the pipette 21 and the rotating drum (or the substrate 26), the polymer solution 24 is spun on the substrate through a spinneret 25 so that nanofibers 27 having a diameter of a few nanometers to hundreds of nanometers are formed on the substrate 26. The nanofibers 27 form a randomly twisted web structure. Each of the nanofibers 27 constituting a nanofiber web contains carbon nanotubes a few nanometers to tens of nanometers in length. A portion of the carbon nanotube is exposed during subsequent stabilization or carbonization, thereby enabling the fabrication of a carbon nanotube emitter structure with a desired shape.

The diameter of the spinneret 25 of the pipette 21, the distance between the pipette 21 and the rotating drum 22 (or the substrate 26), the applied voltage, and the rotation speed of the rotating drum 22 are crucial processing factors in the electrospinning process. These factors can be appropriately selected by a person skilled in the art. It is preferred that the diameter of the nanofibers is larger than that of the carbon nanotubes so as to allow the nanofibers to contain the carbon nanotubes.

The electrospinning apparatus is only one embodiment usable in the present invention. Any electrospinning apparatus that can spin nanofibers from the polymer solution may be used in the electrospinning process.

Hereinafter, the present invention will be explained in more detail with reference to the following example.

However, since this example is provided for illustrative purposes only and the kind of starting materials and other processing conditions can be appropriately changed by a person skilled in the art, it is not to be construed as limiting the scope of the invention.

EXAMPLE 1

First, about 70 wt % of polyacrylonitril (PAN) as a polymer was dissolved in DMF to prepare a polymer solution. Separately, 0.5 wt %, 1 wt %, 3 wt %, 5 wt %, and 10 wt % of multi-wall carbon nanotubes prepared by CVD were mixed with the polymer solution to prepare five carbon nanotube-containing polymer solutions.

By using an apparatus (spinneret diameter: 0.5 mm) similar to the electrospinning apparatus shown in FIG. 3, each of the carbon nanotube-containing polymer solutions was spun on a copper film as a substrate to form five nanofiber web layers thereon. At this time, the applied voltage was 20 KV, and the distance between the spinneret of the pipette and the substrate was 10 cm.

Next, each of the nanofiber web layers was oxidized at about 250° C. for 3 hours with oxygen blowing. FIGS. 4a to 4e represent nanofiber web structures formed after the oxidation (or stabilization). Specifically, these figures are SEM images (5,000×) of nanofiber web structures formed from the polymer solutions in which 0.5 wt %, 1 wt %, 3 wt %, 5 wt % and 10 wt % of the carbon nanotubes were contained, respectively. It could be confirmed from the images that the nanofibers have a diameter ranging from about 300 nm to about 500 nm.

Figure 5:
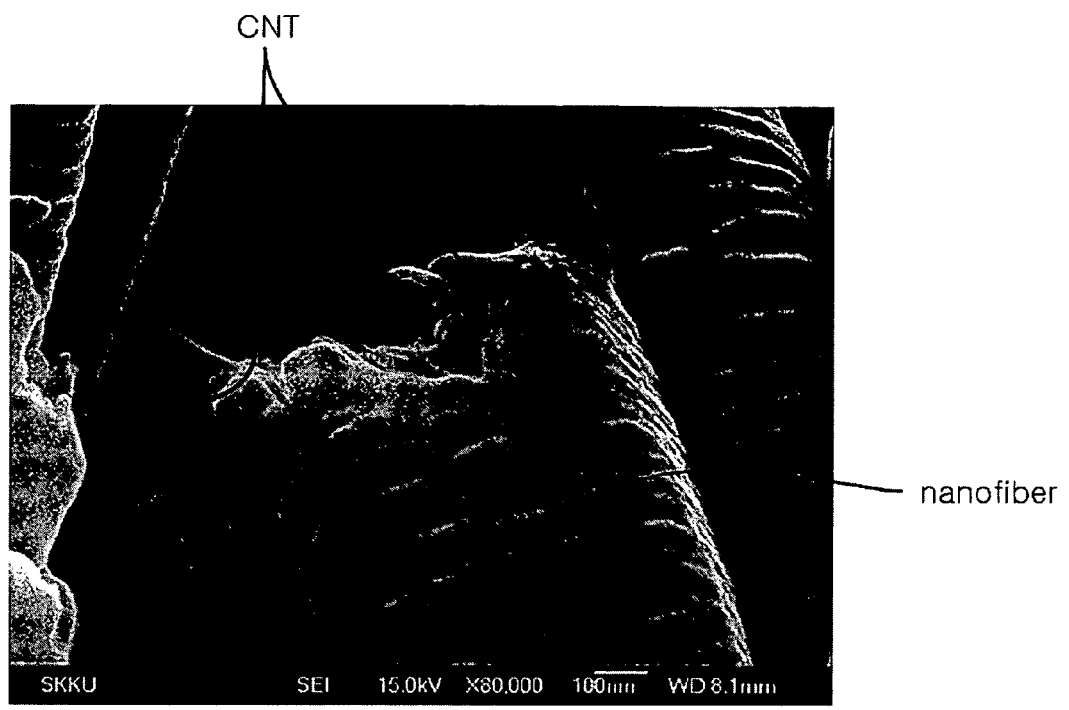
FIG. 5 is a SEM (80,000×) of a nanofiber web structure formed in Example 1 of the present invention.

To determine whether or not the carbon nanotubes were well contained in the respective nanofiber structures, the nanofiber structures were magnified. FIG. 5 is a high magnification SEM image of the nanofiber web structure (formed from the polymer solution in which 10 wt % of the carbon nanotubes were contained) of FIG. 4e. As shown in FIG. 5, two strands of carbon nanotubes (CNTs) (diameter: about 10 nm) are exposed at one end of a nanofiber located in the center of the image. This partial exposure of nanotubes indicates that the structure can act as a field emitter electrode.

Next, the oxidized (or stabilized) nanofibers were annealed under nitrogen atmosphere at about 900° C. for 45 minutes. The annealing was carried out to completely remove organic components remaining after formation of a hexagonal graphite structure. As a result, the nanofiber web layer was composed of carbon fibers.

Figure 6A:
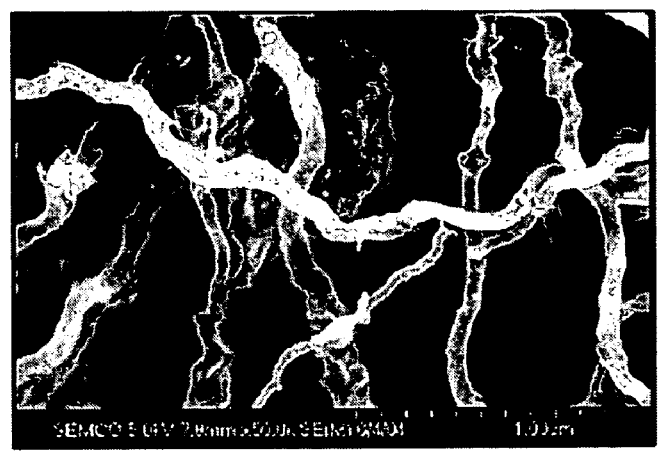
FIGS. 6a to 6c are photographs of a carbon-fiber web structure formed in Example 1 of the present invention taken at different magnifications.
Figure 6B:
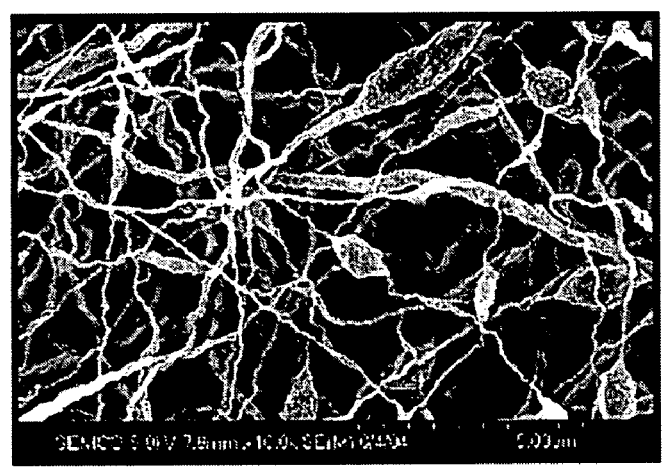
Figure 6C:
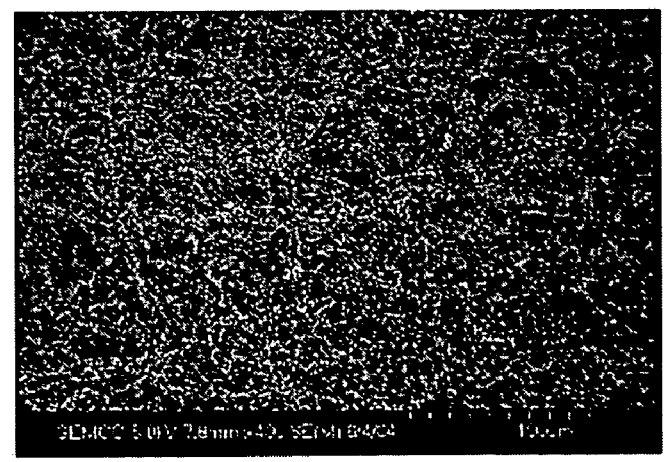

FIGS. 6a through 6c are photographs of the carbon nanofiber web layer (formed from the polymer solution in which 10 wt % of the carbon nanotubes were contained) taken at different magnifications. Referring to FIGS. 6a and 6b, it could be confirmed that basic structures are maintained, despite partial deformation resulting from the removal of organic components remaining after formation of a hexagonal graphite structure.

Figure 7:
FIG. 7 is a photograph showing the luminescent state of a field emission device to which a field emitter electrode having a carbon-fiber web structure formed in Example 1 of the present invention is applied.

FIG. 7 is a photograph showing the luminescence state of a field emission device to which the carbon-fiber web layer is applied. As can be seen from FIG. 7, it was observed by visual examination that a relatively uniform luminescence occurred in the overall areas. This is because a portion of the carbon nanotube is exposed to the outside of the nanofiber, as shown in FIG. 5, and a voltage is applied to the carbon nanotube through the electrically conductive carbon nanofiber to show field emission effects.

As demonstrated in this example, the use of the electrospinning process enables the fabrication of a carbon nanotube emitter electrode capable of improving the adhesive strength of carbon nanotubes while showing superior luminescence properties.

It should be understood that the scope of the present invention is not limited by the foregoing embodiments and the accompanying drawings, but is defined by the claims that follow. Accordingly, those skilled in the art will appreciate that various substitutions, modifications and changes are possible, without departing from the technical spirit of the present invention as disclosed in the accompanying claims, and such substitutions, modifications and changes are within the scope of the present invention.

As apparent from the above description, the field emitter electrode having a carbon-fiber web structure according to the present invention is fabricated by mixing carbon nanotubes, a carbonizable polymer and a solvent to prepare a carbon nanotube-containing polymer solution, and electrospinning the polymer solution. Since the emitter electrode of the present invention not only improves the adhesive strength of carbon nanotubes but also exhibits improved contact resistance, it shows superior luminescence properties.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for fabricating a field emitter electrode having a carbon-fiber web structure, comprising the steps of:

mixing a carbonizable polymer, carbon nanotubes and a solvent to prepare a carbon nanotube-containing polymer solution;

electrospinning the polymer solution to form a nanofiber web layer on a substrate and so that the nanofibers have a diameter larger than the carbon nanotubes;

stabilizing the nanofiber web layer such that the polymer present in the nanofiber web layer is crosslinked; and carbonizing the nanofiber web layer such that the crosslinked polymer is converted to a carbon fiber.

2. The method according to claim 1, wherein the carbonizable polymer is at least one selected from the group consisting of polyacrylonitriles, celluloses, phenol resins, and polyimides.

3. The method according to claim 1, wherein the substrate is an electrically conductive substrate.

4. The method according to claim 1, wherein the stabilization of the nanofiber web layer is carried out by oxidizing the polymer present in the nanofiber web layer in an oxidizing atmosphere at 150~350° C.

5. The method according to claim 1, wherein the carbonization of the nanofiber web layer is carried out by carbonizing the crosslinked polymer in an inert atmosphere at 600~1,300° C.

* * * * *